(12) United States Patent
Wang et al.

(10) Patent No.: US 8,316,940 B2
(45) Date of Patent: Nov. 27, 2012

(54) METHOD OF USING SODIUM SILICATE IN TREATMENT OF SUBTERRANEAN FORMATION FOR WATER CONTROL

(75) Inventors: Xiaolan Wang, Spring, TX (US); Leonard Kalfayan, Cypress, TX (US); Jennifer Cutler, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 239 days.

(21) Appl. No.: 12/621,665

(22) Filed: Nov. 19, 2009

(65) Prior Publication Data

US 2011/0114314 A1    May 19, 2011

(51) Int. Cl.
    *E21B 33/13*    (2006.01)
(52) U.S. Cl. ......................................  166/293; 166/300
(58) Field of Classification Search ......................... None
    See application file for complete search history.

(56) References Cited

U.S. PATENT DOCUMENTS

| | | | |
|---|---|---|---|
| 4,004,639 A * | 1/1977 | Sandiford | 166/292 |
| 4,646,835 A | 3/1987 | Watkins et al. | |
| 2004/0177957 A1 * | 9/2004 | Kalfayan et al. | 166/270 |

OTHER PUBLICATIONS

Parker Ph.D., Anthony A., A Technical Review of Organosilanes and Adhesion, "The Effect of Silane Hydrolysis on Aluminum Oxide Dispersion Stability in Ceramics Processing," 2001, J. Adhesion Sci. and Tech.
Kalfayan L.J. and Watkins, D.R., A New Method for Stabilizing Fines and Controlling Dissolution During Sandstone Acidizing (SPE 20076), Society of Petroleum Engineers (SPE), Apr. 4-6, 1990, p. 539-546, Ventura, CA.

* cited by examiner

*Primary Examiner* — Zakiya W Bates
(74) *Attorney, Agent, or Firm* — John Wilson Jones; Jones & Smith, LLP

(57) ABSTRACT

Compositions and methods of reducing a flow of aqueous liquids through a subterranean formation are provided. The compositions and methods are used for water control. The compositions include a water control additive that is prepared by reacting a soluble sodium silicate and a hydrolysable organosilane compound to produce silanol that reacts and forms a bond with the formation thereby producing a binding polysiloxane.

24 Claims, 2 Drawing Sheets

METHOD OF USING SODIUM SILICATE IN TREATMENT OF SUBTERRANEAN FORMATION FOR WATER CONTROL

BACKGROUND OF THE INVENTION

1. Field of the Invention

The invention broadly relates to methods and compositions for controlling the flow of water in a subterranean formation. The invention more specifically relates to the use of a binding polysiloxane coating in a method of controlling the flow of water in a subterranean formation.

2. Description of the Related Art

Most hydrocarbon producing subterranean formations contain water, as well as hydrocarbons. This water becomes a problem when it is mobile. Unwanted water production is a continuing problem for the oil and gas industry as the presence of mobile water in the subterranean formations unfortunately leads to recovery of a fair amount of water along with the desired hydrocarbons. When water is recovered along with hydrocarbons, both have to be pumped from the formation to the surface, where the water has to be separated from the hydrocarbons and disposed of appropriately. If the water volumes are too high the cost of capturing and discarding the water can make continuation of hydrocarbon recovery cost prohibitive, likely resulting in production termination.

The influx of water into the hydrocarbon producing formation can be from, but not limited to, water flowing through fractures, thief zones and high permeability streaks or water coning. A relatively effective method of reducing the flow of unwanted water is by the mechanism of gellation and/or polymerization of a soluble silicate, such as sodium silicate. This type of process is referred to as chemical grouting, which is generally a process of injecting a chemically reactive solution that behaves as a liquid, but reacts within a pre-determined time frame to form a solid or gel in the subterranean formation.

Soluble silicate has found wide applications in water control. It is a permanent, nonselective product for sealing reservoir porosity and modifying permeability. It works by precipitating sodium silicate to create an amorphous, non-crystalline, ringing gel. The liquid sodium silicate can be made to gel and set in desired time frame (minutes to hours) by controlling the type and concentration of setting agent(s) or activator(s). The most common activators are acid, alkaline earth salts, glyoxal, and formamide. Soluble silicate is most effective when squeezed into perforations, whereas if it is left in the wellbore, the resultant gel plug is temporary and can be broken by tripping pipe through it. Experience shows that a very low break-through pressure can break the rigid gel in a core plug, which indicates a loose blocking mechanism of the silicates. In general, the rigid gel formed by the sodium silicate is somewhat prone to cracking and shattering when pressure is applied across a large cross sectional area.

While the use of sodium silicate in water control is somewhat effective, there is a need to further improve the chemistry of the gellation of sodium silicate to make soluble silicate a more effective water control system. It would be advantageous if the sodium silicate could withstand higher pressures than it is currently able yet still continue to reduce permeability.

SUMMARY OF THE INVENTION

In view of the foregoing, methods and compositions useful as water control agents are provided as embodiments of the present invention. More specifically, a method of treating a subterranean formation by reducing a flow of aqueous liquids there through is provided as an embodiment of the present invention. The water control agent composition of the present invention operates as a water control chemical grout to prevent water from flowing through the subterranean formation. In this embodiment, a water control agent composition is injected into the subterranean formation through a wellbore. The water control agent composition includes a soluble sodium silicate with activators and a hydrolysable organosilane compound. In an aspect, the water control agent composition can also include a crosslinking composition.

The hydrolysable organosilane compound hydrolyzes to form silanol, which is a reactive intermediate. While silanols condense with each other to form polysiloxane, silanols can react with the siliceous grains of the formation to covalently bind the polymer to surfaces of the grains. Silanols can also react with the silanol sites of the loose siliceous particles generated from the setting of soluble sodium silicate to coat and bind them with each other and to the grains of the subterranean formation. Therefore, the polysiloxane acts as a glue to covalently bind the loose silicates from the setting of soluble sodium silicate to the formation and to covalently bind the same loose silicate particles to each other.

In an aspect, the optional crosslinking composition can include one or more crosslinking agents. The crosslinking agent(s) can crosslink silanols to form 3-dimensional silicon gels to further enhance the strength of the water control system. While a variety of crosslinking agents can be utilized to crosslink the silanols, boron crosslinkers are particularly effective. Examples of suitable crosslinking agents can include borate ion releasing compounds, such as boric acid, boric oxide, pyroboric acid, metaboric acid, borax, sodium tetraborate, pentaborate, etc. and combinations thereof. Other suitable compounds that can be used as crosslinking agents in embodiments of the present invention will be apparent to those of skill in the art and are to be considered within the scope of the present invention.

With this composition, the gel plug that forms from the setting of soluble sodium silicate causes a reduction in permeability of the subterranean formation, which stops or reduces the flow of aqueous liquids through the subterranean formation. Additionally, the strength of the gel plug is also improved through the polysiloxane binding of the loose siliceous particles from setting of soluble sodium silicate to each other and to the formation.

As another embodiment of the present invention, a method of making a water control agent composition useful in water control applications is provided. More specifically, a method of making a binding polysiloxane coating is provided that is useful as a water control agent. In this embodiment, a soluble sodium silicate, an activator, and a hydrolysable organosilane compound are contacted with siliceous mineral surfaces of a subterranean formation. The activator hardens or sets the soluble sodium silicate to produce a plurality of silicate particles. The hydrolysable organosilane compound hydrolyzes to produce silanol reactive intermediates that react with each other to produce the binding polysiloxane. The binding polysiloxane adheres or bonds the formed silicate particles to each other and to surfaces of the subterranean formation.

Besides the method embodiments, compositions are also provided as embodiments of the present invention. For example, as an embodiment, a water control additive composition for use in a subterranean formation is provided. The water control additive composition comprises a soluble sodium silicate with an activator and a hydrolysable organosilane compound. In this embodiment, the activator hardens or sets the soluble sodium silicate to produce a plurality of silicate particles in the composition. The hydrolysable organosilane compound hydrolyzes to produce silanol reactive intermediates that react with each other to produce the binding polysiloxane. The binding polysiloxane adheres or bonds the formed silicate particles to each other and to surfaces of the subterranean formation.

Figure 1:
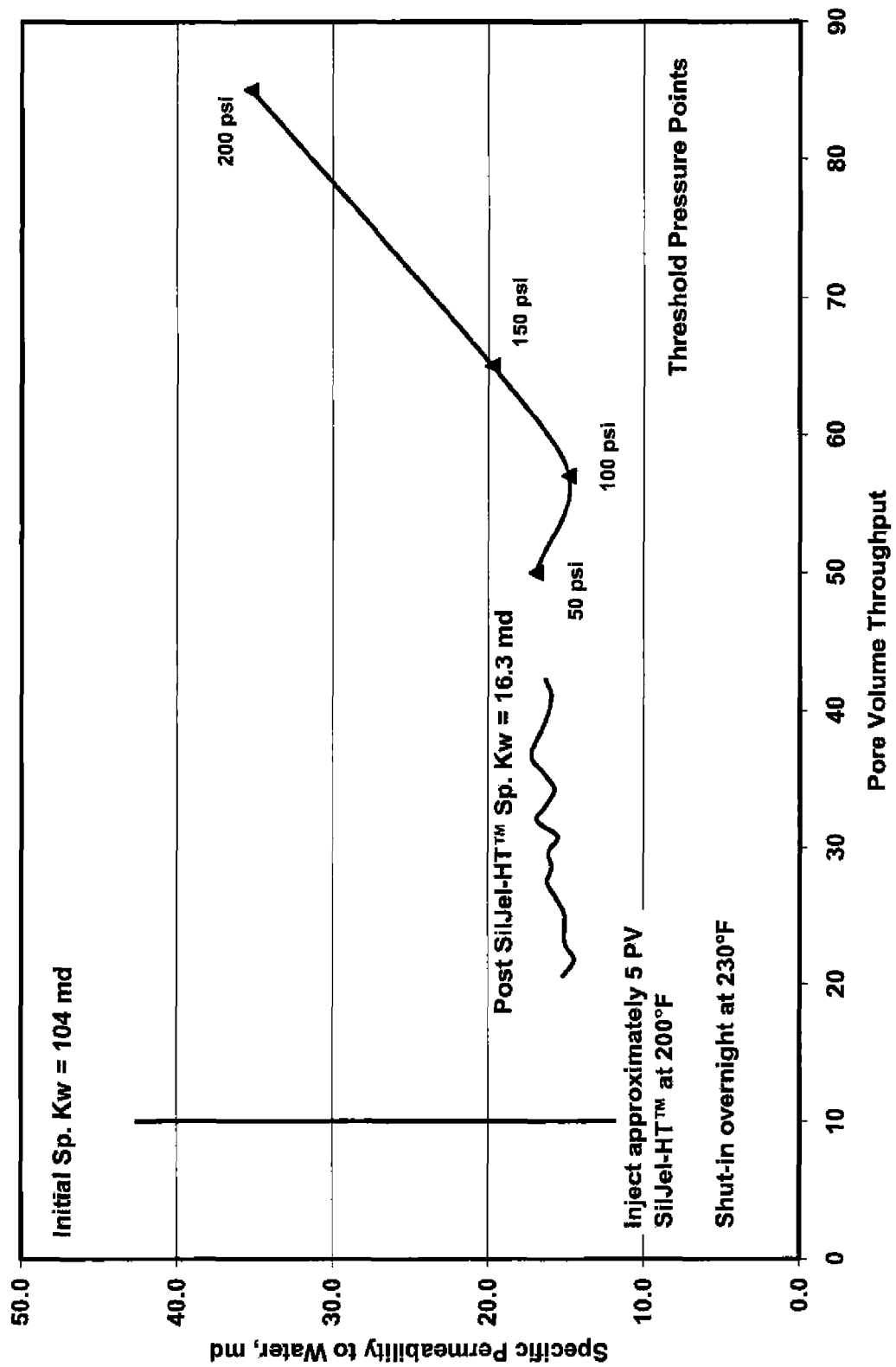
FIG. 1 is a graph illustrating the specific permeability to water (md) versus the pore volume water throughput after treatment with a water control additive made in accordance with prior art embodiments.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the operation and in the treatment of oilfield applications. In the interest of clarity, not all features of an actual implementation are described in this specification. It will, of course, be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

Methods and compositions useful as water control agents are provided as embodiments of the present invention. More specifically, a method of treating a subterranean formation for reducing flow of aqueous liquids through the formation is provided as an embodiment of the present invention. In this embodiment, a water control agent composition is injected into the subterranean formation through a wellbore. The water control agent composition of the present invention operates as a water control chemical grout to prevent water from flowing through the subterranean formation. The water control agent composition includes a soluble sodium silicate with an activator and a hydrolysable organosilane compound. In an aspect, the water control agent composition can also include a crosslinking composition.

Alkoxy groups in the hydrolysable organosilane compound hydrolyze to produce silanol, which is a reactive intermediate. While silanols condense with each other to form polysiloxane, silanols react with the siliceous surfaces on the rock to covalently bind the polymer to grain surfaces of the formation. Silanols can also react with the silanol sites of the loose siliceous particles generated from the setting of the soluble sodium silicate to coat and bind them to each other and to grain surfaces of the subterranean formation. The polysiloxane acts as a glue to covalently bind the loose silicates from the setting of soluble sodium silicate to the formation and to covalently bind the same loose silicate particles to each other. With the composition of the present invention, the gel plug that forms from the setting of soluble sodium silicate cause a reduction in permeability of the subterranean formation, which stops or reduces the flow of aqueous liquids through the subterranean formation. Additionally, the strength of the gel plug is also improved through the polysiloxane binding of the loose siliceous particles from setting of soluble sodium silicate to each other and to the formation.

As another embodiment of the present invention, a method of making a composition useful in water control applications. A method of making a binding polysiloxane is provided. In this embodiment, a soluble sodium silicate, an activator, and a hydrolysable organosilane compound are contacted with siliceous mineral surfaces of a subterranean formation. The activator hardens or sets the soluble sodium silicate to produce a plurality of silicate particles. The hydrolysable organosilane compound hydrolyzes to produce silanol reactive intermediates that react with each other to produce the binding polysiloxane. The binding polysiloxane adheres or bonds the formed silicate particles to each other and to grain surfaces of the subterranean formation.

Besides the method embodiments, compositions are also provided as embodiments of the present invention. For example, as an embodiment, a water control additive composition for use in a subterranean formation is provided. The water control additive composition comprises a soluble sodium silicate with an activator, and a hydrolysable organosilane compound. The activator hardens or sets up the soluble sodium silicate to produce a plurality of silicate particles in the composition. The addition of the hydrolysable organosilane compound improves the chemistry of gellation of the soluble sodium silicate to enable the silicate particles to function better as a more effective water control additive. In this embodiment, the hydrolysable organosilane compound hydrolyzes to produce silanol reactive intermediates that can react with each other to produce polysiloxane. The binding polysiloxane adheres or bonds the formed silicate particles to each other and to grain surfaces of the subterranean formation.

Organosilanes are often used as coupling agents or adhesion promoters. Trialkoxyorganosilanes have been used to enhance adhesion of organic polymers to inorganic substrates, as well as to treat the surfaces of inorganic additives, such as alumina and silica for use in reinforced polymer systems. In the present invention, in an aspect, organosilanes are a component of a water control additive composition that is used to improve the process of chemical grouting of soluble silicate for water control applications.

Among the organosilanes suitable for use in this invention are those having the formula:

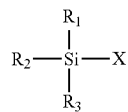

wherein X is a halogen, $R_1$ is an organic group having from 1 to 50 carbon atoms, and $R_2$ and $R_3$ are the same or different halogens or organic groups having from 1 to 50 carbon atoms. In an aspect, X is a halogen selected from the group consisting of chlorine, bromine and iodine with chlorine being preferred, $R_1$ is an alkyl, alkenyl, or aryl group having from 1 to 18 carbon atoms and $R_2$ and $R_3$ are the same or different halogens, or alkyl, alkenyl, or aryl group having from 1 to 18 carbon atoms.

In an aspect, the hydrolysable organosilane compound can be selected from the group consisting of water-soluble organosilane compounds and organosilane compounds that hydrolyze in aqueous media to form water-soluble silanols.

Suitable specific organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, and the like.

In another aspect, the hydrolysable organosilane compound useful in embodiments of the present invention has a general structure comprising:

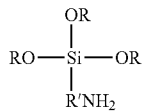

wherein R and R' are independently alkyl, alkenyl, or aryl groups having from 1 to 50 carbon atoms.

In another aspect, some organosilanes suitable for use in this invention are those having the formula:

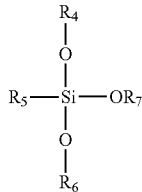

wherein $R_4$, $R_5$, and $R_6$ are independently selected from hydrogen and organic groups having from 1 to 50 carbon atoms, provided not all of $R_4$, $R_5$, and $R_6$ are hydrogen, and $R_7$ is an organic group having from 1 to 50 carbon atoms. In an aspect, $R_4$, $R_5$, and $R_6$ are independently selected from hydrogen, amine, alkyl, alkenyl, aryl, and carbohydryloxy groups having from 1 to 18 carbon atoms, with at least one of the $R_4$, $R_5$, and $R_6$ groups not being hydrogen, and R7 is selected from amine, alkyl, alkenyl, and aryl groups having from 1 to 18 carbon atoms. When $R_4$, $R_5$, and $R_6$ are carbohydryloxy groups, alkoxy groups can be used.

In another aspect, the hydrolysable organosilane compound can include a trialkoxyorganosilane. Suitable hydrolysable organosilane compounds that can be used in the present invention can include monomers, hydrolyzed monomers, hydrolyzed dimers, and hydrolyzed oligomers of an aminopropyltrialkoxysilane, an aminoethylaminopropyltrialkoxysilane, an alkytrialkoxysilane, a vinyltrialkoxysilane, a phenyltrialkoxysilane, mercaptotrialkoxysilane, a styrylaminotrialkoxysilane, a methacryloxypropyltrialkoxysilane, a glycidoxypropyltrialkoxysilane, a perfluorotrialkoxysilane, a perfluoroether functionalized trialkoxysilane, an azole functional trialkoxysilane, a tetraalkoxysilane, methyldiethylchlorosilane, dimethyldichlorosilane, methyltri-chlorosilane, dimethyl-dibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, or combinations thereof. In an aspect, the hydrolysable organosilane compound can include an aminoalkyl siloxane having a structure as follows: $(H_2NCH_2CH_2CH_2SiO_{1.2})_n$. A suitable aminoalkyl siloxane that can be used in the present invention is Silquest® A-1106, which is commercially available from Momentive Performance Materials. Other suitable compounds that can be used as the hydrolysable organosilane compound in embodiments of the present invention will be apparent to those of skill in the art and are to be considered within the scope of the present invention.

In an aspect, the optional crosslinking composition can include one or more crosslinking agents. The crosslinking agent(s) can crosslink silanols to form 3-dimensional silicon gels to further enhance the strength of the water control system. While a variety of crosslinking agents can be utilized to crosslink the silanols, boron crosslinkers are particularly effective. Examples of suitable crosslinking agents can include borate ion releasing compounds, such as boric acid, boric oxide, pyroboric acid, metaboric acid, borax, sodium tetraborate, pentaborate, etc. and combinations thereof. Other suitable compounds that can be used as crosslinking agents in embodiments of the present invention will be apparent to those of skill in the art and are to be considered within the scope of the present invention.

The water control agent compositions of the present invention can also operate as a water control chemical grout to inhibit water flow through the subterranean formation The water control agent composition can be pumped into normally high permeability or natural fractures. As indicated previously, the water control agent composition forms a binding polysiloxane that binds the formed silicate particles in the composition to the grain surfaces of the subterranean formation and each other, enabling the amorphous gel of the formed silicate particles to seal natural fractures, or pore spaces and substantially limit or stop water flow. By binding the silicate particles to each other and to the grain surfaces of the subterranean formation, the durability and strength of the gel is greatly improved.

The activator or setting agent used in embodiments of the present invention hardens or enables the soluble sodium silicate to set up, which promotes adhesion of the silicate particles to the grain surfaces of subterranean formations. However, silicate particles alone cannot sustain high operating pressures. With the addition of the hydrolysable organosilane compound, silicate particles can be used in systems with much higher operating pressures. Various types of activators can be used in embodiments of the present invention. A suitable activator can include acid, alkaline earth, aluminum salts, and organic compounds such as glyoxal, acetic ester, urea, ethylene carbonate formamide, etc. or combinations thereof. Other suitable types of activators will be apparent to those of skill in the art and are to be considered within the scope of the present invention.

In the water control additive compositions described herein, additional additives can be used in various embodiments. For example, in an aspect, the water control additive composition can further include a reaction accelerator, a hardener, a solvent, or combinations thereof. Aldehyde is an example of a suitable reaction accelerator that also functions as a hardener. A suitable solvent is ethanol. Besides the types of additives, the amounts of these additives can also be varied in embodiments in the present invention. Other suitable additives that can be used in embodiments of the present invention and effective amounts of such additives will be apparent to those of skill in the art and are to be considered within the scope of the present invention.

The amount of the hydrolysable organosilane compound can be varied in embodiments of the present invention. For example, in an aspect, the hydrolysable organosilane compound can be present in a range of about 0.5 gpt (gallons per 1000 gallons fluid) to about 50 gpt of the water control additive composition; alternatively, in a range of about 1 gpt to about 20 gpt; or alternatively, in a range of about 2 gpt to about 5 gpt. Other suitable amounts of hydrolysable organosilane compound can be used, as will be apparent to those of skill in the art and are to be considered within the scope of the present invention.

The methods and compositions described herein can be used in various types of formations. As an example, the subterranean formation can include a sandstone formation. Other types of formations can be treated, but it is believed that the most benefit will be achieved in a sandstone formation. Other suitable types of formations in which the methods and compositions described herein can be used will be apparent to those of skill in the art and are to be considered within the scope of the present invention.

When adding the hydrolyzable organosilane to the soluble sodium silicate, the hydrolysis of alkoxy groups on the organosilane forms silanol (Si—OH), which is a reactive intermediate can have the general formula:

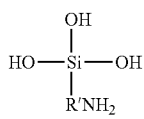

where R' is independently an alkyl, alkenyl, or aryl group having from 1 to 50 carbon atoms when the hydrolysable organosilane compound has a general structure comprising:

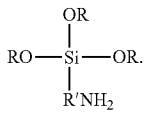

In an aspect, when adding the hydrolyzable organosilane to the soluble sodium silicate, the hydrolysis of alkoxy groups on the organosilane forms silanol (Si—OH), which is a reactive intermediate can have the general formula:

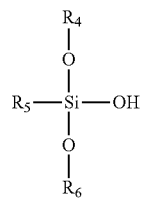

wherein $R_4$, $R_5$, and $R_6$ are independently selected from hydrogen and organic groups having from 1 to 50 carbon atoms, provided not all of $R_4$, $R_5$, and $R_6$ are hydrogen, when the hydrolysable organosilane compound has a general structure comprising:

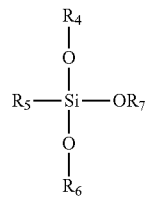

wherein $R_4$, $R_5$, and $R_6$ are independently selected from hydrogen and organic groups having from 1 to 50 carbon atoms, provided not all of $R_4$, $R_5$, and $R_6$ are hydrogen, and $R_7$ is an organic group having from 1 to 50 carbon atoms.

While the silanol reactive intermediates directly condense with each other to produce polysiloxane, silanols can also react with the siliceous grains of the subterranean formation to covalently bond the polymer to the grain surfaces. This polysiloxane binds the loose silicate particles generated from the setting of soluble silicate together and to the formation. The gel plug that is formed by the binding of the silicate particles to the formation reduces the flow of aqueous liquid through the subterranean formation, i.e., the permeability of the formation is decreased. The bonds between the silicate particles and the surface of the subterranean formation also allow the formation to be subjected to much higher pressures while maintaining the lower permeability.

As an advantage of the present invention, when the methods and compositions of the present invention are used in subterranean formations such as sandstone formations, the permeability of the subterranean formation is reduced. The reduced permeability of the subterranean formation prevents water from flowing through the subterranean formation. The methods and compositions of the present invention also enable the subterranean formations to withstand greater pressures than without the use of the water control additive of the present invention. The addition of the hydrolysable organosilane compound to the soluble sodium silicate for water control helps solve problems, such as cracking and shattering associated with setting of soluble silicate alone and also significantly increases the break-through pressure of the system.

EXAMPLE

The following example is included to demonstrate the use of compositions in accordance with embodiments of the present invention. It should be appreciated by those of skill in the art that the techniques disclosed in the example that follows represents techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

In this example, a water control additive composition was prepared with setting agents (SilJel-HT™ that is commercially available from BJ Services Company) was used as the soluble sodium silicate. An organosilane based chemical (FSA-1 that is commercially available from BJ Services Company) was used as the hydrolysable organosilane compound.

Testing of sandstone samples to determine the effect of SilJel-HT™ with and without a fines stabilizer additive (FSA-1) was conducted at 230° F. The sandstone samples were comprised of primarily medium- to fine-grained quartz with permeability to air of 250 md.

Each sample was evacuated and saturated under 2% ammonium chloride brine. Each sample was loaded into a hydrostatic coreholder under 1000 psi net confining stress. The 2% NH₄Cl brine was injected in an arbitrary production direction against 200 psi backpressure as the system temperature was elevated to 200° F. Differential pressure and flow rate were monitored and a specific permeability to brine was calculated.

Approximately 5 pore volumes of the SilJel-HT™ treatment was injected in the treatment direction against 200 psi backpressure. The system temperature was elevated to 230° F. while maintaining 1000 psi net confining stress. The treatment was allowed to sit in the pore space overnight (15 hours).

Flow was returned in the production direction. Differential pressure and now rate were monitored and a specific permeability to brine was calculated. Additionally, the brine was injected at incrementally increasing pressures to determine the breakthrough, or threshold, pressure of the SilJel-HT™ treatment.

As shown in FIG. 1, the specific permeability to brine was 104 md. Approximately 5 pore volumes of SilJel-HT™ was injected through the sample. After temperature increase to 230° F. and overnight shut-in, return brine permeability was 16.3 md. The regain percentage is 15.7%. Threshold pressure testing indicated that SilJel-HT™ alone did not maintain the permeability reduction at 200 psi injection pressure.

Figure 2:
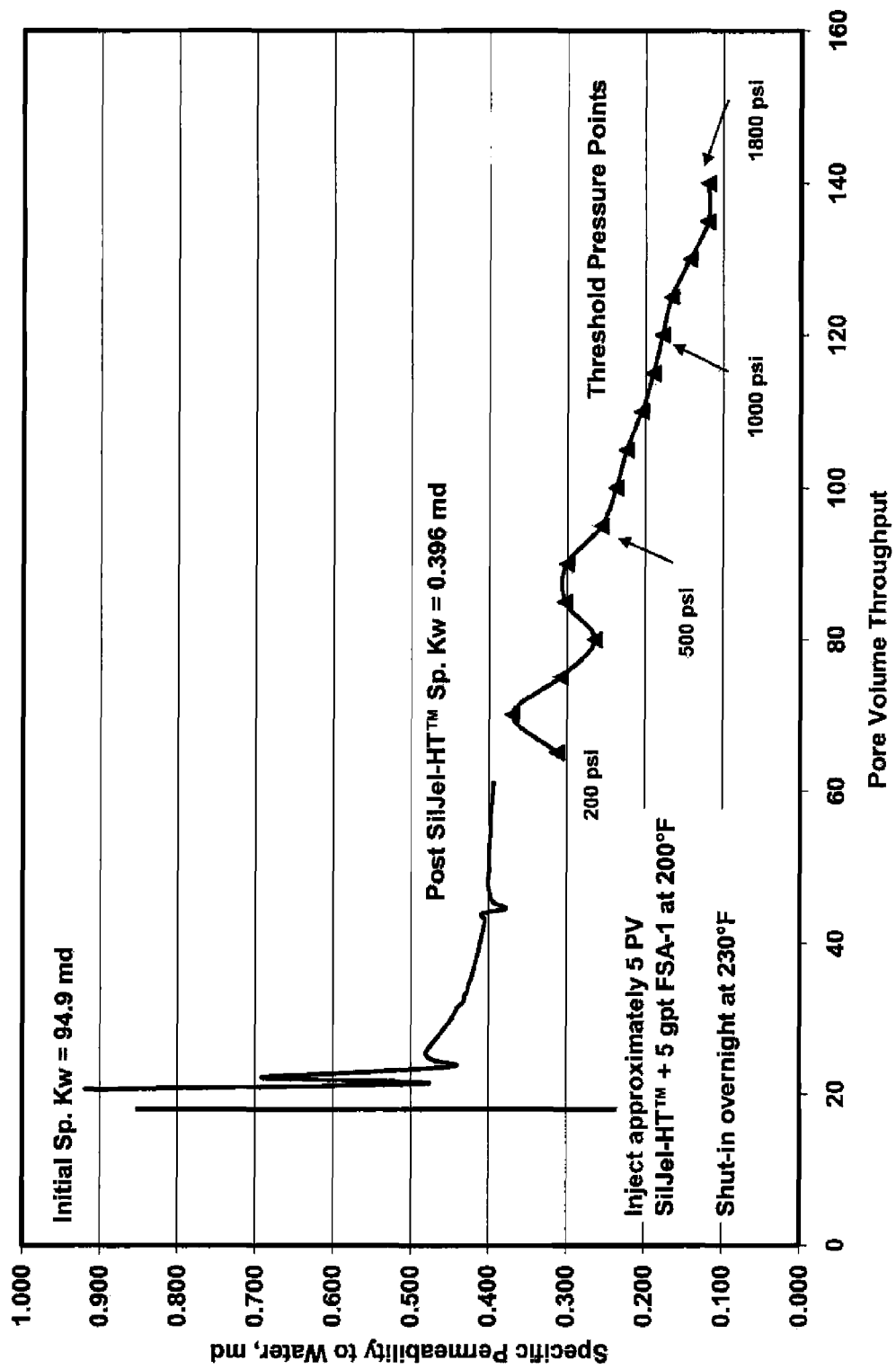
FIG. 2 is a graph illustrating the specific permeability to water (md) versus the pore volume water throughput after treatment with a water control additive made in accordance with embodiments of the present invention.

As shown in FIG. 2, the specific permeability to brine was 95 md. Approximately 5 pore volumes of SilJel-HT™+5 gpt FSA-1 was injected through the sample. After temperature increase to 230° F. and overnight shut-in, return brine permeability was 0.396 md. The regain percentage is 0.42%. Threshold pressure testing indicated that SilJel-HT™+5 gpt FSA-1 maintained the permeability reduction to at least 1800 psi injection pressure.

As can be seen in this Example, the addition of the organosilane compound substantially improved the performance of the system when compared with only using soluble sodium silicate. Without the organosilane compound, the system failed at 200 psi brine injection pressure. With the organosilane compound, the system still held at 1800 psi brine injection pressure. Using the water control additive composition in accordance with embodiments of the present invention provided more effective pore space restriction of the subterranean formation, which resulted in a stronger barrier against water flow.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of treating a subterranean formation for reducing a flow of aqueous liquids through the subterranean formation comprising the steps of:
   a. injecting a water control agent composition into the subterranean formation through a wellbore, the water control agent composition comprising a soluble sodium silicate, an activator, and a hydrolysable organosilane compound that hydrolyzes to produce a silanol reactive intermediate;
   b. allowing the soluble sodium silicate and the activator to set and form a plurality of silicate particles to seal the subterranean formation to prevent water production; and
   c. allowing the silanol reactive intermediate to (1) condense to form a polysiloxane; (2) react with the siliceous grains of the formation to covalently bind the subterranean formation to the silicate particles; and (3) bind the silicate particles from setting of the soluble sodium silicate to each other.

2. The method of claim 1, wherein the hydrolysable organosilane compound is selected from the group consisting of water-soluble organosilane compounds and organosilane compounds that hydrolyze in aqueous media to form water-soluble silanols.

3. The method of claim 1, wherein the hydrolysable organosilane compound is selected from the group consisting of amino silanes and vinyl silane compounds.

4. The method of claim 1, wherein the composition further comprises an aldehyde, ethanol, or combinations thereof.

5. The method of claim 1, wherein the activator is selected from the group consisting of acids, alkaline earth salts, aluminum salts, organic compounds, and combinations thereof.

6. The method of claim 1, wherein the hydrolysable organosilane compound comprises a trialkoxyorganosilane.

7. The method of claim 6, wherein the hydrolysable organosilane compound has a structure comprising:

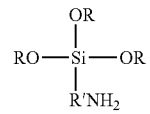

wherein R and R' are independently an alkyl, alkenyl, or aryl group having from 1 to 50 carbon atoms.

8. The method of claim 6, wherein the hydrolysable organosilane compound has a structure comprising:

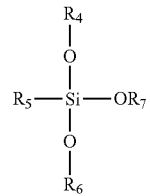

wherein $R_4$, $R_5$, and $R_6$ are independently selected from hydrogen and organic groups having from 1 to 50 carbon atoms, provided not all of $R_4$, $R_5$, and $R_6$ are hydrogen, and $R_7$ is an organic group having from 1 to 50 carbon atoms.

9. The method of claim 1, wherein the hydrolysable organosilane compound is present in a range of about 0.5 gpt to about 50 gpt of the composition.

10. The method of claim 1, wherein the subterranean formation comprises a sandstone formation.

11. The method of claim 1, wherein the water control agent composition further comprises a crosslinking agent.

12. The method of claim 1, further wherein the water control agent composition comprises an aldehyde, ethanol, or combinations thereof and wherein the activator is selected from the group consisting of acids, alkaline earth salts, aluminum salts, organic compounds, and combinations thereof.

13. A method of treating a subterranean formation to control water flow in the formation comprising:
(a) contacting a soluble sodium silicate, an activator, and a hydrolysable organosilane compound with siliceous mineral surfaces of the subterranean formation;
(b) hardening the soluble sodium silicate to produce a plurality of silicate particles;
(c) hydrolyzing the hydrolysable organosilane compound to produce silanol reactive intermediates and condensing the silanol reactive intermediates with each other to form a polysiloxane which adheres or bonds the formed silicate particles to each other.

14. The method of claim 13, wherein the hydrolysable organosilane compound has a structure comprising:

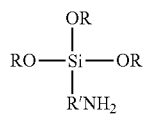

wherein R and R' are independently an alkyl, alkenyl, or aryl group having from 1 to 50 carbon atoms.

15. The method of claim 13, wherein the hydrolysable organosilane compound has a structure comprising:

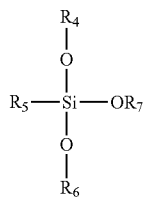

wherein $R_4$, $R_5$, and $R_6$ are independently selected from hydrogen and organic groups having from 1 to 50 carbon atoms, provided not all of $R_4$, $R_5$, and $R_6$ are hydrogen, and $R_7$ is an organic group having from 1 to 50 carbon atoms.

16. The method of claim 13 further comprising a reaction accelerator, a hardener, a solvent, a crosslinking composition, or combinations thereof.

17. The method of claim 13, further comprising aldehyde, ethanol, or combinations thereof and wherein the activator comprises acid, alkaline earth, aluminum salts, organic compounds, or combinations thereof.

18. The method of claim 13, wherein the hydrolysable organosilane compound comprises a trialkoxyorganosilane.

19. The method of claim 13, wherein the hydrolysable organosilane compound is present in a range of about 0.5 gpt to about 50 gpt.

20. The method of claim 13, wherein the subterranean formation comprises sandstone.

21. A method of treating a subterranean formation for reducing a flow of aqueous liquids through the subterranean formation comprising:
a. injecting into the subterranean formation a composition comprising a soluble sodium silicate, an activator, and a hydrolysable organosilane compound;
b. hydrolyzing the hydrolysable organosilane compound to a silanol reactive intermediate and producing therefrom a binding polysiloxane;
c. generating loose silicate particles from the setting of the soluble sodium silicate to form a gel plug;
d. binding the loose silicate particles to the polysiloxane and to the grain surfaces of the subterranean formation to strengthen the gel plug; and
e. reducing the flow of aqueous liquids through the subterranean formation by the formation of the strengthened gel plug.

22. The method of claim 21, wherein the hydrolysable organosilane compound comprises a trialkoxyorganosilane.

23. The method of claim 21, wherein the hydrolysable organosilane compound is present in a range of about 0.5 gpt to about 50 gpt.

24. The method of claim 21, wherein the water control additive composition further comprises a crosslinking agent.

* * * * *